US005696202A

United States Patent [19]
Torre

[11] Patent Number: 5,696,202
[45] Date of Patent: Dec. 9, 1997

[54] TRANSPARENT, COLORLESS, AMORPHOUS POLYAMIDES AND MOLDED ARTICLES

[75] Inventor: Phil. Hans Dalla Torre, Domat/Ems, Switzerland

[73] Assignee: Ems-Inventa AG, Zurich, Switzerland

[21] Appl. No.: 555,790

[22] Filed: Nov. 9, 1995

[30] Foreign Application Priority Data

| Feb. 1, 1995 | [CH] | Switzerland | 00 270/95 |
| Sep. 19, 1995 | [EP] | European Pat. Off. | 95114719 |

[51] Int. Cl.$^6$ ................................................ C08L 77/00
[52] U.S. Cl. .......................... 524/606; 525/432; 528/346
[58] Field of Search ...................... 528/346; 524/606; 525/432

[56] References Cited

U.S. PATENT DOCUMENTS

| 2,512,606 | 9/1950 | Bolton et al. | 528/346 |
| 2,696,482 | 12/1954 | Pease | 528/340 |
| 3,597,400 | 8/1971 | Kashiro et al. | 528/338 |
| 4,207,411 | 6/1980 | Shue | 528/338 |
| 4,369,305 | 1/1983 | Pagilagan | 528/338 |
| 4,847,356 | 7/1989 | Hoppe et al. | 528/346 |
| 5,310,860 | 5/1994 | Maj et al. | 528/346 |

FOREIGN PATENT DOCUMENTS

| 0 050 742 A1 | 5/1982 | European Pat. Off. |
| 0 069 700 A1 | 1/1983 | European Pat. Off. |
| 628602 | 12/1994 | European Pat. Off. |
| 15 95 354 C3 | 10/1966 | Germany. |
| 2 034 541 | 7/1970 | Germany. |
| 37 17 928 A1 | 5/1987 | Germany. |
| 37 28 334 A1 | 8/1987 | Germany. |
| 43 10 970 A1 | 4/1993 | Germany. |

*Primary Examiner*—Mark D. Sweet
*Attorney, Agent, or Firm*—Browdy and Neimark

[57] ABSTRACT

Colorless, amorphous polyamides, their blends or alloys, and the molded articles with high alternate bending strengths that can be produced from them, are made available; they are preferably made up of aliphatic diamines and aliphatic dicarboxylic acids, and at the same time have high strength, high rigidity, high heat distortion, and good solvent resistance.

10 Claims, No Drawings

TRANSPARENT, COLORLESS, AMORPHOUS POLYAMIDES AND MOLDED ARTICLES

The subject of the present invention is transparent, colorless and amorphous polyamides and blends or alloys thereof with homopolyamides, and the molded articles that can be made thereof, which have high tenacity, good solvent resistance, and at the same time high rigidity and a high heat distortion temperature and high fatigue resistance strengths to alternating bending, and which in contrast to the prior art are colorless.

In European Patents EP 50 742 and EP 69 700 and U.S. Pat. Nos. 2,696,482, 3,597,400, 4,207,411 and 4,369,305, amorphous polyamides of aliphatic diamines and/or 4,4'-diaminodicyclohexylmethane (PACM) and aromatic dicarboxylic acids are described, but they have inadequate tenacity and transparency and are not colorless.

The polyamides of U.S. Pat. No. 2,512,606 and Published, German Patent Disclosure Application DE-OS 20 34 541 of aliphatic dicarboxylic acids and unsubstituted cycloaliphatic diamines with a high proportion of trans-trans-isomer are inadequately resistant to stress cracking in boiling water and alcohols, and in some cases are cloudy. Finally, the polyamides described in German Patent Disclosure DE 43 10 970 require an especially high proportion of trans-trans-isomer of from 35 to 60% of the 4,4'-diaminodicyclohexylmethane, which is attained only by means of special reaction conditions with expensive distillative fractionation in the production of the diamine. This makes these diamines not inconsiderably more expensive. They were commercially available under the tradenames PACM 50® (DuPont, Wilmington, Del.) and Wondamin® (New Japan Chemical Corporation, Osaka). Dicycan® (BASF), an unsubstituted bis(4-aminocyclohexyl)methane, has similar high trans-trans-isomer proportions. Although these diamines do bring about satisfactory tenacity of the polyamide, nevertheless the resistance to alternate bending stress and the dimensional stability under temperature of the shaped articles made from them is inadequate for certain applications, such as filter bowls in a relatively high temperature range.

German Patent Disclosure DE 15 95 354 describes a process for preparing crystal-clear polyamides from dicarboxylic acids and a defined isomer mixture of bis (aminocyclohexyl)-propane, which can contain up to 80% caprolactam. The later "clouding" of those polyamides that contain dodecanedioic acid as the dicarboxylic acid is expressly mentioned.

German Patent Disclosure DE 37 17 928 covers transparent copolyamides of preferably aromatic dicarboxylic acids containing the isomers, no longer available today, of bis(4-amino-3-methyl-5-ethylcyclohexyl)methane, which have insufficiently high Tg values, and German Patent Disclosure DE 37 28 334 claims blends, with modified impact strength, of copolyamides of aromatic dicarboxylic acids and a mixture of hexamethylene diamine and PACM, which again have likewise low Tg values.

The object was accordingly to furnish polyamide molding compositions that make it possible to overcome the disadvantages of the prior art.

This object is attained by the transparent, colorless and amorphous polyamides, and their blends or alloys, and by the molded articles that can be made thereof.

In particular, it is attained by polyamides, as well as blends and alloys of at least one aliphatic homopolyamide with these polyamides, in which preferably long-chain aliphatic monomer units are combined in said polyamides with cycloaliphatic monomer units having at least one cyclohexane ring, and which as a result of this combination shows extremely high alternating bending strengths and at the same time high tenacity, high rigidity, high heat distortion under temperature and good solvent resistance.

Both alkyl-substituted cycloaliphatic diamines, preferably those with from 14 to 22 carbon atoms, can be combined with long-chain aliphatic dicarboxylic acids that have from 8 to 36 atoms and preferably 8 to 12 carbon atoms, which in special cases can be replaced with small proportions of aromatic dicarboxylic acids, preferably a maximum of 20 mol % and especially preferably a maximum of 10 mol % thereof, and also long-chain unsubstituted aliphatic diamines, preferably those with from 8 to 14 carbon atoms, can be combined with cycloaliphatic dicarboxylic acids that have at least one cyclohexane ring. These acids can be replaced with a maximum of 20 weight %, and preferably a maximum of 10 weight %, of at least one aromatic dicarboxylic acid. Of course, if no aromatic dicarboxylic acid is used, the present transparent polyamides are homopolyamides.

The term alkyl-substituted cycloaliphatic diamines is understood to mean those that have one or more alkyl substituents, such as methyl, ethyl, propyl and isobutyl radicals, on at least one cyclohexane ring. The term cycloaliphatic dicarboxylic acids is understood to mean those that have one or more cyclohexane rings.

Surprisingly, it has been found that especially the transparent polyamides of decanedioic acid or dodecanedioic acid and a commercially available isomer mixture of the 3,3'-Dimethyl-4,4'-diaminodicyclohexylalkane type wherein the alkane has one to three C-atoms, and in particular 3,3'-Dimethyl-4,4'-diaminodicyclohexylmethane type or -in another expression bis-(3-methyl-4-aminocyclohexyl)methane, namely Laromin $C_{260}$®⓪ (BASF), alone or in blends or mixtures with homopolyamides, are suitable for molded articles that are highly ductile, extraordinarily resistant to alternate bending and nevertheless rigid and high heat distortion and resistant to stress cracking in alcohol, ketones and hot water.

Another preferred embodiment is the combination of decane diamine or dodecane diamine with 1,4-cyclohexane dicarboxylic acids for the polyamides according to the invention.

The polyamides according to the invention may be prepared by processes of the prior art under pressure in autoclaves or in reaction extruders at temperatures that are preferably above 260° C.

The blends or alloys of such polyamides with homopolyamides are prepared by the usual processes known from the prior art.

The aliphatic homopolyamides advantageously used for this purpose are preferably chosen from the group comprising PA69, PA610, PA612, PA912, PA1212, PA11, and PA12.

Polyamides, blends and alloys can optionally contain additives, preferably from the group of lubricants, UV and heat stabilizers, chain regulators, pigments, colorants and reinforcing agents; among the latter, glass, minerals, fibers and fillers are preferred.

The invention also encompasses molded articles that can be made from the polyamides, blends or alloys according to the invention.

The molded articles according to the invention are distinguished not only by very high alternate bending strengths, which are documented over at least 1,000,000 and preferably 1,500,000 and especially preferably at least 1,900,000 alternate bending cycles (measured at 23° C. with dry test bars, 4 mm thick, in accordance with DIN 53442), but also at the same time by notch impact strengths of at least 10 and preferably 12 KJ/m² at 23°, and high heat distortion under temperature as a consequence of Tg values of over 175° C., with excellent resistance to stress cracking in most solvents.

This combination of important properties is made possible at least in part by high molecular weights, or high relative solution viscosities, of the polyamides according to the invention, which are higher than 1.7 (measured in a 0.5% concentration in m-cresol). This has not been described thus far in the prior art.

The following examples are intended to explain but not to limit the concept of the invention.

EXAMPLE 1

Via a heated receiving vesel, 13,800 g of dodecane dicarboxylic acid, 14,590 g of Laromin $C_{260}$® [bis-(3-methyl-4- aminocyclohexyl)methane], 30 g of 50% aqueous $H_3PO_2$, 150 g of benzoic acid, and 10 l of water were placed in a pressure autoclave with a 130 l capacity, and stirred until homogeneous.

After a compression, decompression and degassing phase, the polyamide was pressed out as a strand passed under cold water and granulated. The dried granulate had the following properties:

| granulate evaluation | | colorless brilliant transparent |
|---|---|---|
| eta rel 0.5% m-cresol | | 1.71 |
| melt viscosity at 270° C./122.6 N | (Pa · s) | 986 |
| Tg | (°C.) | 157.1 |
| cold crystallization point | (°C.) | no peaks in the melt |
| melting point | (°C.) | no peaks in the melt |
| terminal groups $NH_2/COOH$ | (µ equiv/g) | 51/34 |
| $H_2O$ content | (weight %) | 0.010 |

Test bars were made from the granulate by injection molding: Thereby the test bars: showed the following mechanical properties:

| impact strength, dry 23° C./–40° C. | (kJ/m²) | nb/nb (= no break) |
|---|---|---|
| notched impact strength, dry 23° C./–40° C. | (kJ/m²) | 12/10 |
| tensile strength at break, dry/conditioned 23° C. | (N/mm²) | 48/45 |
| elongation at break, dry/conditioned | (%) | 79/86 |
| tensile E-modulus, dry/conditioned 23° C. | (N/mm²) | 1640/1640 |

Number of load change cycles per DIN 53442, dry, 23° C., using bars 4 mm thick, in a C. Schenk alternate load testing apparatus, type PWO 150/1966: 1,960,000

Stress cracking strength in methanol, acetone, ethyl acetate, toluene: no stress cracking Small DIN bars were placed in boiling water for 5 months; the test specimens remained transparent, showed no deformation at all, and retained 80% of the original notch impact strength.

EXAMPLE 2 (COMPARISON EXAMPLE)

In the same manner as in example 1, via a receiving vessel, 13,800 g of dodecane dicarboxylic acid, 12,870 g of a bis(4-aminocyclohexyl)methane (Dicycan®), with a high trans/trans content, 30 g of 50% aqueous hypophosphorous acid, 150 g of benzoic acid and 10 l of water were placed into a reaction vessel and stirred to make a homogeneous mixture.

After an identical polycondensation reaction to that of Example 1, a transparent strand, which however was cloudy by a slight haze, was extracted and granulated.

The granulate properties were as follows:

| granulate evaluation | | transparent with a clouding haze |
|---|---|---|
| eta rel. (0.5%, m-cresol) | | 1.68 |
| melt viscosity at 270° C./122.6 N | (Pa · s) | 1648 |
| Tg | (°C.) | 139.9 |
| cold crystallization point | (°C.) | 173.5 |
| melting point | (°C.) | 252.7 |
| terminal groups $NH_2/COOH$ | (µ equiv/g) | 50/112 |
| $H_2O$ content | (weight %) | 0.015 |

The injection molded test specimens had the following mechanical values:

| impact strength, dry 23° C./–40° C. | (kJ/m²)nb/nb | (= no break) |
|---|---|---|
| notched image strength, dry 23° C./–40° C. | (kJ/m²) | 1.6/0.7 |
| tensile strength at break, dry/conditioned 23° C. | (N/mm²) | 41 |
| elongation at break, dry/conditioned | (%) | 36 |
| tensile E-modulus, dry/conditioned 23° C. | (N/mm²) | 1560/1630 |

Number of load change cycles per DIN 53442, dry, 23° C., using bars 4 mm thick, in a C. Schenk alternate load testing apparatus, type PWO 150/1966: 328,600

Stress cracking strength in methanol, acetone, ethyl acetate, toluene: incipient stress cracking As in Example 1, small DIN bars were placed in boiling water for 5 months; the bars became cloudy, were deformed, and has a notch impact strength that was reduced by more than 50% in comparison with the initial value.

I claim:

1. Transparent, colorless, amorphous polyamide, or blend or alloy thereof with at least one aliphatic homopolyamide, wherein the transparent polyamide has a relative solution viscosity higher than 1.7, and is made up substantially of at least one alkyl-substituted cycloaliphatic diamine having from 14 to 22 carbon atoms consisting essentially of bis-(3-methyl-4-aminocyclohexyl)alkane wherein the alkane has one to three C-atoms, and at least one unbranched aliphatic dicarboxylic acid having from 8 to 14 carbon atoms, wherein the polyamide or blend or alloy thereof optionally contains processing- and/or usage-dictated additives;

wherein said transparent polyamide is a homopolyamide having alternating monomer units of (1) long-chain aliphatic monomer units and (2) cycloaliphatic monomer units having at least one cyclohexane ring; and wherein a standardized test specimen made from said transparent polyamide has an alternate bending strength of more than 1,000,000 cycles at 23° C.

2. Polyamide or blend or alloy of claim 1, characterized in that standardized test specimens made therefrom have alternate bending strengths of more than 1,500,000 cycles at 23° C.

3. The polyamide of claim 1, characterized in that the aliphatic dicarboxylic acids have from 8 to 12 carbon atoms.

4. The polyamide of claim 3, characterized in that the aliphatic dicarboxylic acids are selected from the group consisting of decanedioic acid and dodecanedioic acid.

5. The polyamide of claim 1, characterized in that the diamine is a bis-(3-methyl-4-aminocyclohexyl) methane.

6. The polyamide of claim 10, characterized in that the diamine is bis-(3-methyl-4-aminocyclohexyl) methane, and the dicarboxylic acid is decanedioic acid or dodecanedioic acid.

7. The polyamide blend or alloy of claim 1, characterized in that the at least one homopolyamide is selected from the group consisting of PA69, PA610, PA612, PA11, PA12, PA912 and PA1212.

8. The polyamide of claim 1, characterized in that the additives are selected from the group comprising lubricants, heat and UV stabilizers, chain regulators, pigments, colorants, impact strength modifiers, flame retardants, reinforcing agents and fillers.

9. Molded article prepared from a blend or alloy of a homopolyamide with at least one transparent homopolyamide of claim 1.

10. A polyamide according to claim 1, wherein standardized test specimens made therefrom have alternate bending strength of more than 1,900,000 cycles at 23° C.

* * * * *